United States Patent [19]

Rosin

[11] Patent Number: 4,989,311

[45] Date of Patent: Feb. 5, 1991

[54] BEARING PULLER

[76] Inventor: Leonard L. Rosin, 202 N. Cass, Oberlin, Kans. 67749

[21] Appl. No.: 478,969

[22] Filed: Feb. 12, 1990

[51] Int. Cl.[5] .............................................. B23P 19/04

[52] U.S. Cl. ...................................................... 29/259

[58] Field of Search ................. 29/258, 259, 260, 263, 29/264

[56] References Cited

U.S. PATENT DOCUMENTS

| | | | |
|---|---|---|---|
| 3,594,890 | 7/1971 | Cordell et al. | 29/260 |
| 3,605,242 | 9/1971 | Kuffner | 29/263 |
| 3,689,978 | 9/1972 | Kelso | 29/259 |
| 4,034,458 | 7/1977 | Ford et al. | 29/259 |
| 4,471,517 | 9/1984 | Denmeade et al. | 29/259 |

*Primary Examiner*—Robert C. Watson

[57] ABSTRACT

A bearing puller tool for pulling ball bearing units from a housing having a shaft therein journaled in the ball bearing. The bearing puller tool includes a support plate having slots therein for accommodating a pair of bearing puller members which releasably engage the ball bearing through the space between the inner and outer races. A threaded force applying member engages a threaded opening in the support plate and engages the end of the shaft journaled in the ball bearing. Rotation of the force applying member transmits the pulling force to the bearing puller member to cause the ball bearing to be progressively pulled from the shaft and housing.

5 Claims, 1 Drawing Sheet

BEARING PULLER

This invention relates to a tool for pulling ball bearings.

BACKGROUND OF THE INVENTION

When ball bearings become worn or damaged, the damaged ball bearings must be removed and replaced. Various kinds of tools have been developed for removing ball bearings, but these prior art tools usually are constructed to engage either the outer or inner race at three separate locations during the removal operation. The application of these prior art tools to the damaged ball bearing usually involves difficult manipulation. The prior art bearing pullers also typically employ an impact hammer, pressure collet, or the like, for applying force during the bearing removal operation.

SUMMARY OF THE INVENTION

It is an object of this invention to provide a novel and improved ball bearing puller tool, of simple and inexpensive construction, which engages the inner and outer races of the ball bearing, and which exerts a pulling action by rotation of a threaded member.

More specifically, in carrying out the preferred embodiment of this invention, a pair of bearing puller elements are inserted between and in engaging relation with the inner and outer races of the ball bearing to be removed, and these puller elements are then releasably clamped to a support plate which threadedly carries a force applying member. Rotation of the threaded force applying member is transmitted as a pulling action to the puller elements. Typically, the keeper elements of the ball bearing unit must be displaced before the puller elements may be inserted into the space between the inner and outer races at two separate locations. In the event that the ball elements of the ball bearing unit are missing, a tool using three separate puller elements will be used.

FIGURES OF THE DRAWING

DESCRIPTION OF THE PREFERRED EMBODIMENT

Figure 1:
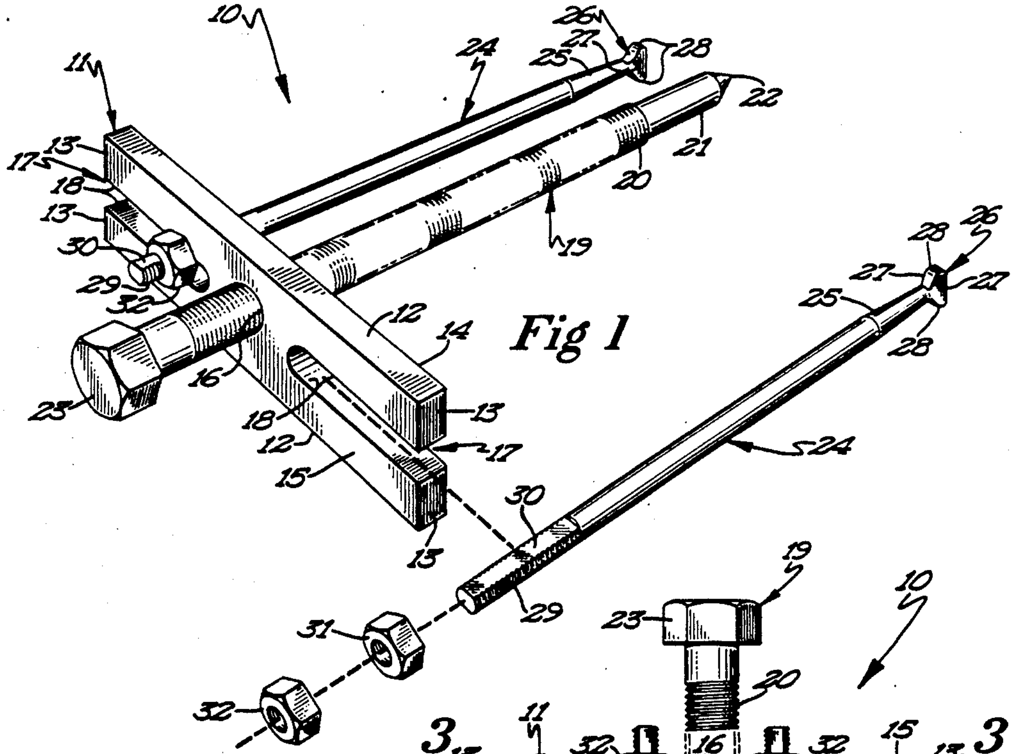
FIG. 1 is a perspective view of the novel puller tool, with certain components thereof illustrated in exploded relation to depict the detailed construction of the parts.
Figure 2:
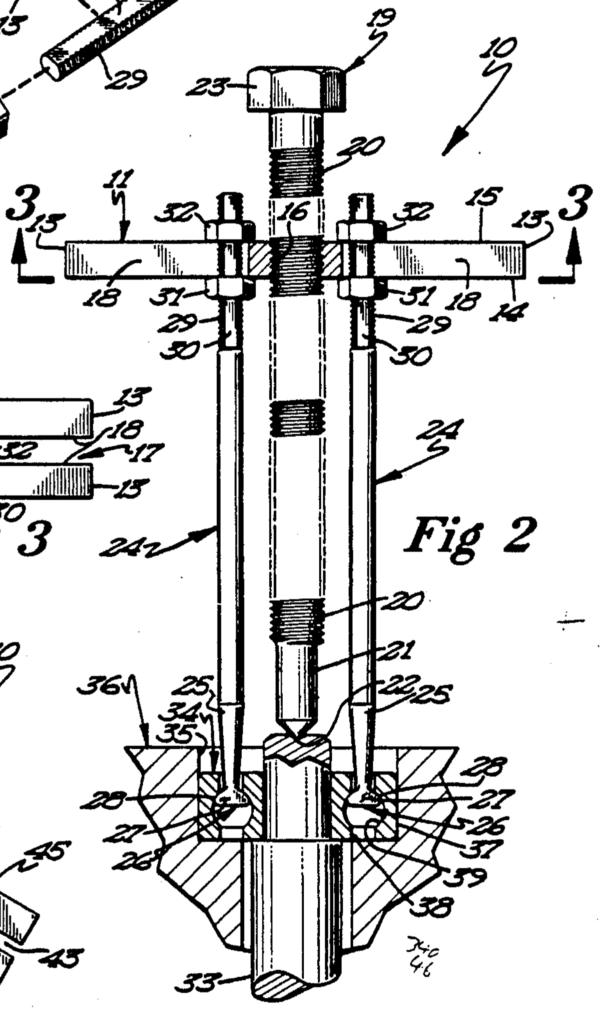
FIG. 2 is an end elevational view of the tool applied to a ball bearing to be removed.
Figure 3:
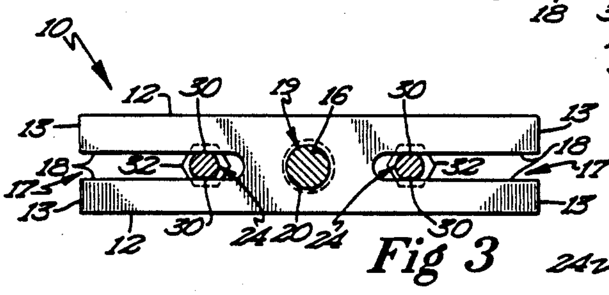
FIG. 3 is a cross-sectional view taken approximately along the line 3—3 of FIG. 2 and looking in the direction of the arrows.

Referring now to the drawings and, more specifically, to FIGS. 1-3, it will be seen that one embodiment of the novel ball bearing puller tool, designated generally by the reference numeral 10, is thereshown. The tool 10 includes a generally rectangular-shaped flat support plate 11 having elongate substantially straight transverse longitudinal edges 12 and end edges 13. The support plate has a substantially flat front surface 14 and a substantially flat rear surface 15, and is provided with a centrally located threaded opening 16 therethrough. The support plate 11 is also provided with a pair of elongate transversely extending slots 17 therein, each extending inwardly from adjacent the associated end edge 13 thereof. It will be noted that each slot 17 defines a pair of opposed flat surfaces 18, as best seen in FIG. 3.

The tool 10 also includes an elongate force applying member 19, which is provided with external threads 20 throughout a major portion of its length. The force applying member 19 has an unthreaded reduced front end portion 21 that terminates in a center point 22. The rear end of the force applying member 19 is provided with an enlarged hexagonal head 23.

The bearing puller tool 10 also includes a pair of similar elongate bearing puller members 24, which are of generally cylindrical configuration. Each of the bearing puller members 24 has a uniform diameter throughout a major portion of its length, but includes a tapered front end portion 25 that terminates in an anchor element 26. The anchor element 26 includes a pair of opposed flat surfaces 27 and arcuate surfaces 28, which extend from the tapered end portion 25. The thickness dimension of the anchor element, measured between the opposed flat surfaces 27, is less than the general uniform diameter of the bearing puller member. The width dimension of the anchor element, measured between the arcuate surfaces 28 at their greatest width, corresponds generally to the general overall uniform diameter of the bearing puller member. These dimensions are important in permitting insertion and locking of the anchor element into the space between the bearing races in a manner to be described hereinbelow.

It will be noted that the rear end portion of each bearing puller member 24 is provided with threads 29, as best seen in FIG. 1. It will further be noted that this threaded rear end portion of each bearing puller member is provided with opposed planar surfaces 30. It is pointed out that, when the anchor element 26 of each bearing puller member 24 is inserted and locked into a ball bearing unit, the rear end portion of the bearing puller member will be inserted into one of the slots 17. Each bearing puller member 24 is provided with a nut 31 and a nut 32, which threadedly engage the threaded rear end portion 29 for engagement with opposite surfaces of the support plate 11. The nuts 31, 32 of each bearing puller member engage the front and rear surfaces of the support plate for clamping the associated bearing puller member to the support plate after each puller member has been inserted into and locked to the ball bearing unit.

In use, the user will use the tool to remove a ball bearing unit, such as the ball bearing unit 34, which journals a shaft 33 in a bearing recess 35 of a conventional housing or casting 36. The ball bearing unit may journal the shaft of a conventional motor or the like. The ball bearing unit 34 includes an outer race 37 and an inner race 38 having an annular space 39 therebetween for accommodating the balls and the keeper in a well-known manner.

The user will first forcibly move the keeper (not shown) from the ball bearing at two locations so that the front ends of the bearing puller members may be inserted into the annular space 39 between the races. During insertion, each bearing puller member 24 will be oriented to an insertion position so that the flat surfaces of the anchor element are disposed in substantially tangential relation with respect to the outer surface of the inner race. After insertion of the anchor element into the space 39, the bearing puller elements will be rotated 90 degrees to a retention position so that the arcuate portions of each anchor element engage the inner and outer races, as illustrated in FIG. 2. The bearing puller members will then be inserted into the slots 17, and the nuts 31 and 32 for each bearing puller member will be tightened to clamp the bearing puller members to the plate 11, as illustrated in FIGS. 2 and 3.

Thereafter, the force applying member will be tightened so that the center point thereof engages in the center point recess on the shaft 33. The user may then use any conventional tool, such as a wrench or the like, to rotate the head 23 of the force applying member in a direction to progressively cause the bearing puller members to forcibly pull the ball bearing unit from the recess 35 and the shaft 33. In this regard, it will be appreciated that the outer race is press fitted into the recess 35 and that the inner race is press fitted on the shaft 33.

The force applied to the force applying member will be transmitted to the bearing puller member to evenly and effectively pull the ball bearing unit from the recess of the casting and from the shaft. After the bearing has been removed, it is only necessary to loosen one of the nuts 31 and 32 for each bearing puller member for removal of the bearing puller member from the associated slots 17. Thereafter, the bearing puller member may be rotated to remove the anchor element from the annular recess 39. It will be appreciated that the bearing puller members are prevented from rotation by the coaction of the flat surfaces 30 with the flat surfaces 18 defined by the slots 17.

Figure 4:
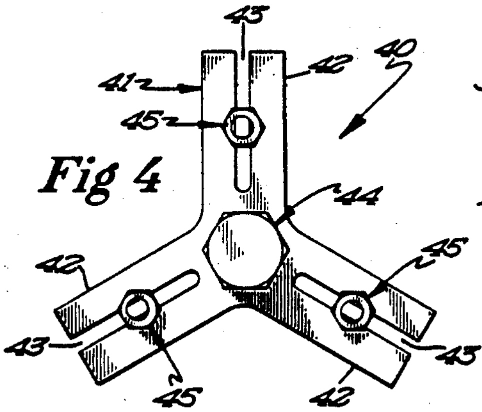
FIG. 4 is an end elevational view of a slightly modified form of the invention.

Referring now to FIG. 4, a slightly modified form of the bearing puller tool, designated by the reference numeral 40, is thereshown. The bearing puller tool 40 is similar to the embodiment of FIG. 1, but differs only in the configuration of the support plate, designated generally by the reference numeral 41, and the number of bearing puller members 24 used. The tool 40 is used when one or more ball components are missing from the ball bearing unit.

It will be seen that the support plate 41 is of tripodal configuration and includes three similar legs 42, which are of elongate straight configuration and extend outwardly from the central portion of the plate. The included angles between adjacent legs is approximately 120 degrees so that the legs are equally spaced apart. Each leg 42 has an outwardly opening elongate slot 43 therein in the manner of the embodiment of FIG. 1.

The ball bearing puller tool 40 also includes a force applying member 44, which is substantially identical in all respects to the force applying member 19 and projects through and threadedly engages a central internally threaded opening in the support plate. The tool 40 is provided with three bearing puller members 45, which are clamped to the plate 41 in the slots 43 in the identical manner as the embodiment of FIG. 1. The bearing puller members are substantially identical in construction to the bearing puller members of FIGS. 1-3. The use of three bearing puller members permits uniform force to be exerted on the inner and outer races, even if one or more of the ball components are missing.

From the foregoing description, it will be seen that I have provided a novel bearing puller tool which may be readily applied to a damaged or worn ball bearing unit to permit easy and ready removal of the unit from the associated structure.

Thus, it will be seen that I have provided a novel bearing puller tool, which is not only of simple and inexpensive construction, but one which functions in a more efficient manner than any heretofore known comparable structure.

What is claimed is:

1. A bearing puller tool for pulling ball bearings from a structure including a housing having a shaft therein journaled in the ball bearing, the ball bearing including an inner and outer race having balls therebetween, comprising:

an elongate rectangular support plate having a centrally located threaded opening therein and a plurality of spaced apart outwardly opening elongate slots therein, each slot extending inwardly from one end of said support plate, an elongate threaded force applying member threadedly engaging the threaded opening in said support plate and projecting therethrough, one end portion of said force applying member being constructed for engagement with the shaft journaled in the ball bearing to be removed, means on the other end portion of said force applying member for engagement with a device for rotating said force applying member, a plurality of elongate bearing puller members, each having an anchoring element at one end thereof, said anchoring element being shaped for insertion into the space between the inner and outer races of the bearing to be removed when said associated bearing puller member is oriented into an insertion position, each anchor element being retained by the bearing races when the associated bearing puller member is rotated through an arc of predetermined magnitude from the insertion position to the retention position, the other end portion of each bearing puller member being threaded and being inserted into one of the slots of said support plate, said other end portion of each bearing puller member having opposed planar confronting surfaces cooperating with an adjacent slot surface to prevent rotation of the bearing puller member, a pair of nuts threadedly engaging the threaded end portion of each bearing puller member said nuts of one pair being positioned on opposite sides of the support plate for clamping each bearing puller member to the plate whereby, when said force applying member is rotated, the ball bearings engaged by said bearing puller member will be progressively pulled from the associated structure.

2. The bearing puller tool as defined in claim 1 wherein said support plate is of elongate rectangular configuration having a pair of said slots therein, each extending inwardly from one end of said support plate, each slot accommodating one of a pair of bearing puller members.

3. The bearing puller tool as defined in Claim 1 wherein each bearing puller member is rotated through an arc of approximately 90 degrees from said insertion position to the retention position.

4. The bearing puller tool as defined in Claim 1 wherein each bearing puller member is provided with opposed planar confronting surfaces which cooperate with surfaces defining the associated slot in the support plate to prevent rotation of the bearing puller member.

5. The bearing puller tool as defined in Claim 1 wherein said support plate is of tripodal configuration including three legs extending outwardly therefrom, each leg having a slot therein for accommodating one of three bearing puller members therein.

* * * * *